(12) United States Patent
Idicheria et al.

(10) Patent No.: US 10,487,753 B2
(45) Date of Patent: Nov. 26, 2019

(54) METHOD AND APPARATUS FOR CONTROLLING OPERATION OF AN INTERNAL COMBUSTION ENGINE

(71) Applicant: GM Global Technology Operations LLC, Detroit, MI (US)

(72) Inventors: Cherian A. Idicheria, Novi, MI (US); Hanho Yun, Oakland Township, MI (US); Paul M. Najt, Bloomfield Hills, MI (US); Arun S. Solomon, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 63 days.

(21) Appl. No.: 15/771,491

(22) PCT Filed: Dec. 3, 2015

(86) PCT No.: PCT/US2015/063682
§ 371 (c)(1),
(2) Date: Apr. 27, 2018

(87) PCT Pub. No.: WO2017/095411
PCT Pub. Date: Jun. 8, 2017

(65) Prior Publication Data
US 2018/0347476 A1 Dec. 6, 2018

(51) Int. Cl.
*F02D 41/26* (2006.01)
*F02D 13/02* (2006.01)
(Continued)

(52) U.S. Cl.
CPC ......... *F02D 13/0265* (2013.01); *F02D 13/02* (2013.01); *F02D 13/0261* (2013.01);
(Continued)

(58) Field of Classification Search
CPC .. F02D 13/02; F02D 13/0265; F02D 13/0261; F02D 21/08; F02D 41/0057;
(Continued)

(56) References Cited

U.S. PATENT DOCUMENTS

| 6,286,482 B1 | 9/2001 | Flynn et al. |
| 2011/0232602 A1 | 9/2011 | Schenk et al. |

(Continued)

FOREIGN PATENT DOCUMENTS

EP    2578854 A1    4/2013

OTHER PUBLICATIONS

International Search Report and Written Opinion issued in International Application No. PCT/US2015/063682, dated Aug. 31, 2016.

*Primary Examiner* — Hai H Huynh
(74) *Attorney, Agent, or Firm* — Quinn IP Law

(57) ABSTRACT

An internal combustion engine includes a fuel injection system including a fuel injector disposed to inject fuel into the combustion chamber, and a plasma ignition system including a groundless barrier discharge plasma igniter that protrudes into the combustion chamber. A controller includes an executable instruction set to control the engine in a compression-ignition mode when the output torque request indicates a low load condition, including instructions to control a variable valve actuation system and control the plasma ignition system to execute plasma discharge events subsequent to controlling the fuel injection system to execute a fuel injection event, wherein the fuel injection event achieves a cylinder charge having a lean air/fuel ratio.

19 Claims, 4 Drawing Sheets

(51) Int. Cl.
*F02D 41/00* (2006.01)
*F02D 41/30* (2006.01)
*F02D 41/40* (2006.01)
*F02P 3/01* (2006.01)
*F02P 9/00* (2006.01)
*F02P 23/04* (2006.01)
*F02D 21/08* (2006.01)
*F02M 26/00* (2016.01)

(52) U.S. Cl.
CPC ......... *F02D 21/08* (2013.01); *F02D 41/0057* (2013.01); *F02D 41/3041* (2013.01); *F02D 41/401* (2013.01); *F02D 41/402* (2013.01); *F02M 26/00* (2016.02); *F02P 3/01* (2013.01); *F02P 9/00* (2013.01); *F02P 23/04* (2013.01); *F02M 2026/001* (2016.02); *Y02T 10/128* (2013.01); *Y02T 10/18* (2013.01); *Y02T 10/44* (2013.01)

(58) Field of Classification Search
CPC .. F02D 41/401; F02D 41/402; F02D 41/3041; F02M 26/00; F02M 2026/001; F02P 23/04; F02P 9/00; F02P 3/01; Y02T 10/128; Y02T 10/18; Y02T 10/44
USPC ..... 123/90.15, 436, 143 B, 568.21; 701/103, 701/108, 110
See application file for complete search history.

(56) References Cited

U.S. PATENT DOCUMENTS

2012/0173117 A1 7/2012 Serizawa et al.
2015/0211431 A1 7/2015 Harada et al.

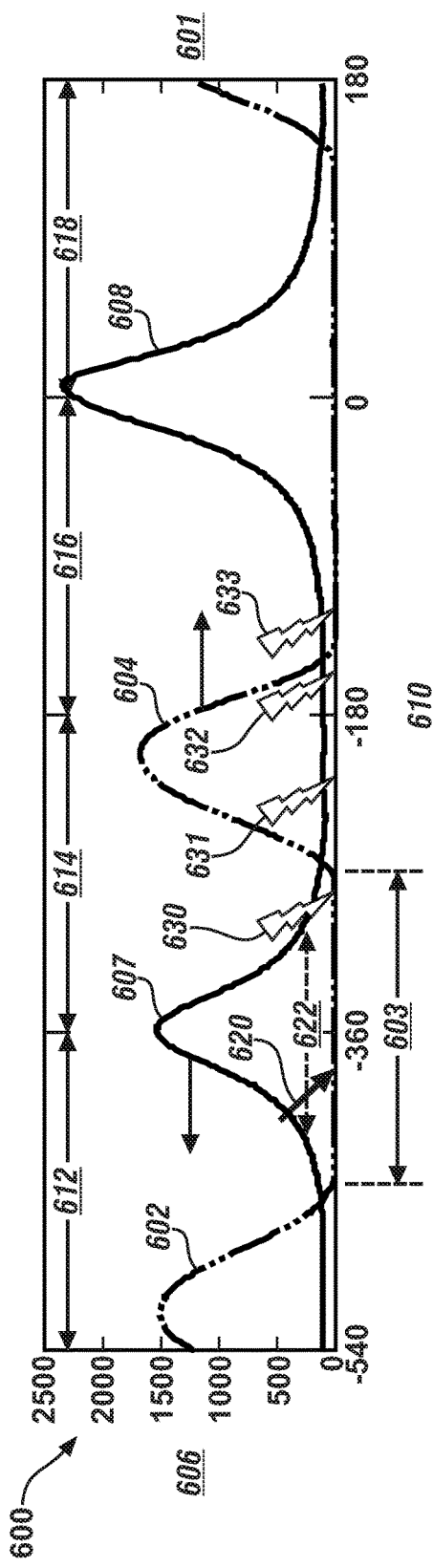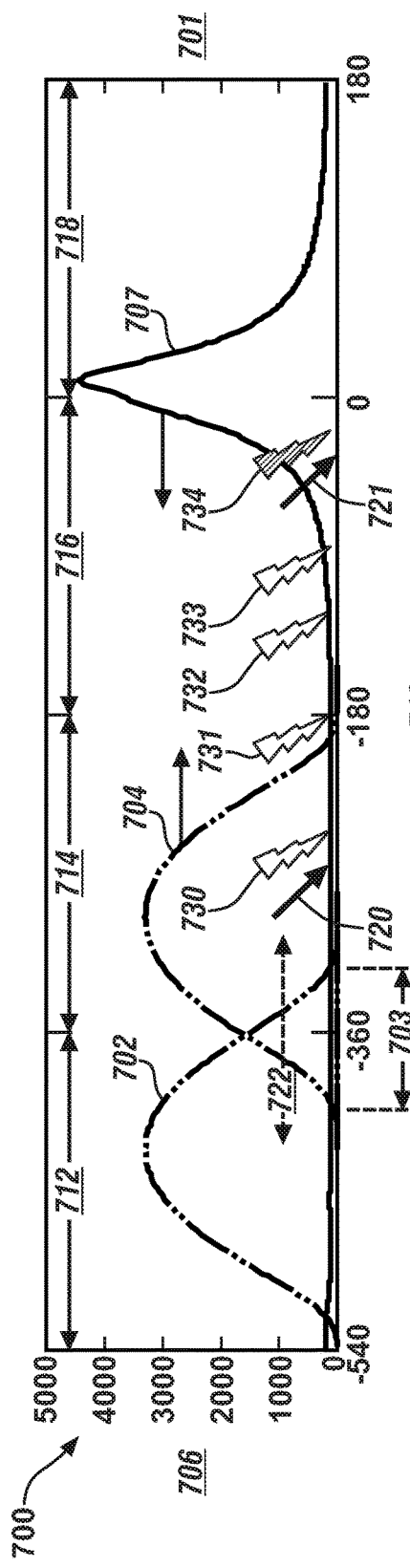

METHOD AND APPARATUS FOR CONTROLLING OPERATION OF AN INTERNAL COMBUSTION ENGINE

TECHNICAL FIELD

This disclosure relates to an internal combustion engine configured with a direct injection fuel system and a plasma igniter, and control thereof.

BACKGROUND

Known spark-ignition (SI) engines introduce an air/fuel mixture into each cylinder that is compressed during a compression stroke and ignited by a spark plug. Known compression-ignition (CI) engines inject pressurized fuel into a combustion chamber near top dead center (TDC) of the compression stroke that ignites upon injection. Combustion for both SI engines and CI engines involves premixed or diffusion flames controlled by fluid mechanics.

SI engines may operate in different combustion modes, including, by way of non-limiting examples, a homogeneous SI combustion mode and a stratified-charge SI combustion mode. SI engines may be configured to operate in a homogeneous-charge compression-ignition (HCCI) combustion mode, also referred to as controlled auto-ignition combustion, under predetermined speed/load operating conditions. HCCI combustion is a distributed, flameless, kinetically-controlled auto-ignition combustion process with the engine operating at a dilute air/fuel mixture, i.e., lean of a stoichiometric air/fuel point, with relatively low peak combustion temperatures, resulting in low NOx emissions. An engine operating in the HCCI combustion mode forms a cylinder charge that is preferably homogeneous in composition, temperature, and residual exhaust gases at intake valve closing time. The homogeneous air/fuel mixture minimizes occurrences of rich in-cylinder combustion zones that form smoke and particulate emissions.

SUMMARY

An internal combustion engine is described and includes a combustion chamber formed by cooperation of a cylinder bore formed in a cylinder block, a cylinder head and a piston. An intake valve and an exhaust valve are disposed in the cylinder head and operative to control gas flow to the combustion chamber, and variable valve actuation systems are operative to control openings and closings of the intake valve and the exhaust valve. A fuel injection system including a fuel injector is disposed to inject fuel into the combustion chamber, and a plasma ignition system including a groundless barrier discharge plasma igniter protrudes into the combustion chamber. A controller is operative to control operation of the variable valve actuation systems, the fuel injection system and the plasma ignition system in response to an output torque request. The controller includes an executable instruction set to control the engine in a compression-ignition mode when the output torque request indicates a low load condition, including instructions to control the variable valve actuation systems and control the plasma ignition system to execute plasma discharge events subsequent to controlling the fuel injection system to execute a fuel injection event, wherein the single fuel injection event achieves a cylinder charge having a lean air/fuel ratio.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which:

FIG. 6 graphically shows engine parameters during a single engine cycle during operation of an embodiment of the engine described with reference to either FIG. 1 or 2 in a flameless, controlled compression-ignition engine operating mode employing an embodiment of the plasma ignition controller to generate plasma discharge events, in accordance with the disclosure;

FIG. 7 graphically shows engine parameters during a single engine cycle during operation of an embodiment of the engine described with reference to either FIG. 1 or 2 in a flame-assisted controlled compression-ignition engine operating mode.

DETAILED DESCRIPTION

Figure 1:
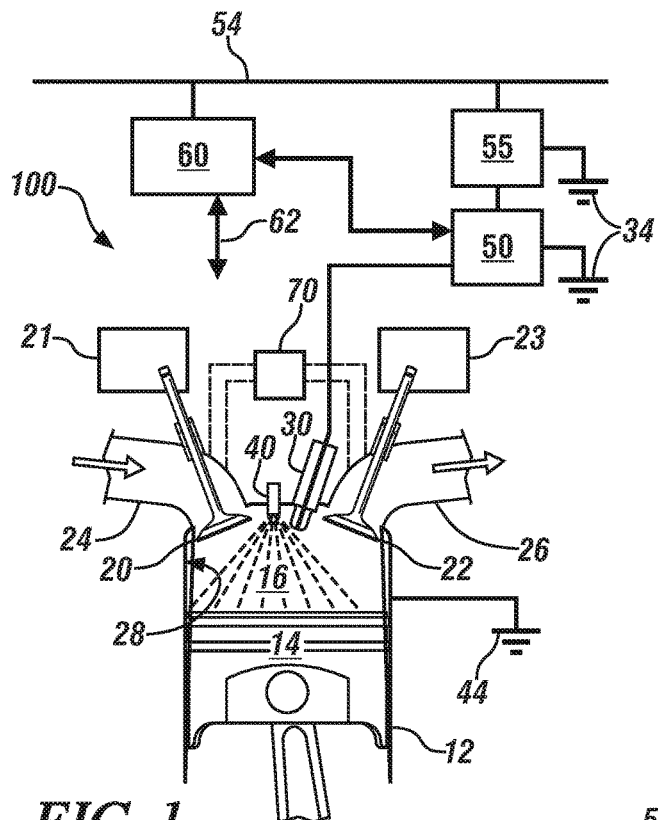
FIGS. 1 and 2 schematically illustrate cross-sectional views of embodiments of a single cylinder for an internal combustion engine including an in-cylinder groundless dielectric barrier-discharge plasma igniter of a plasma ignition system, in accordance with the disclosure.

Referring now to the drawings, wherein the depictions are for the purpose of illustrating certain exemplary embodiments only and not for the purpose of limiting the same, FIG. 1 schematically illustrates a cross-sectional view of a single cylinder for a multi-cylinder internal combustion engine (engine) 100 and an associated engine controller (ECM) 60. The engine 100 includes an engine block 12 defining a plurality of cylinder bores 28 containing movable pistons 14, one of which is shown. The engine block 12 electrically connects to an electrical ground 44. Operation of the engine 100 is controlled by the ECM 60, which communicates with a plasma ignition controller 50 to control operation of a plurality of groundless dielectric barrier-discharge plasma igniters (plasma igniters) 30 that are disposed in-cylinder to ignite fuel-air cylinder charges.

Each of the cylinder bores 28 houses a movable piston 14. The walls of the cylinder bore 28, a top portion of the piston 14 and an inner exposed portion of the cylinder head 18 define outer boundaries of a variable-volume combustion chamber 16 that is disposed therein. Each piston 14 mechanically couples to a connecting rod that rotatably couples to a crankshaft, and the piston 14 slidably translates within the cylinder bore 28 between a top-dead-center (TDC) position and a bottom-dead-center (BDC) position to transfer power to the crankshaft during combustion events.

The cylinder head 18 includes an intake port or runner 24 that is in fluid communication with the combustion chamber 16, with an intake valve 20 disposed within for controlling airflow into the combustion chamber 16. The cylinder head 18 also includes an exhaust port or runner 26 that is in fluid communication with the combustion chamber 16, with an exhaust valve 22 disposed within for controlling exhaust gas flow out of the combustion chamber 16. FIG. 1 shows a single intake valve 20 and a single exhaust valve 22 associated with the combustion chamber 16, but it is appreciated that each combustion chamber 16 may be configured with multiple intake valves and/or multiple exhaust valves. Engine airflow may be controlled by selectively adjusting position of a throttle valve (not shown) and adjusting openings and/or closings of the intake valves 20 and the exhaust valves 22. An intake variable valve actuation system 21 is arranged to control openings and closings of the intake valves 20, and an exhaust variable valve actuation system 23 is arranged to control openings and closings of the exhaust valves 22. The intake and exhaust variable valve actuation systems 21, 23 may include variable cam phasing and a selectable multi-step valve lift, e.g., multiple-step cam lobes that provide two or more valve lift positions, and employ urgings of valve springs and lobes on one or more rotating camshafts that are rotatably coupled to the crankshaft, or other suitable mechanisms to effect such control. The change in valve position of the multi-step valve lift mechanism may be a discrete step change.

The cylinder head 18 is arranged with a fuel injector 40 and the plasma igniter 30. The fuel injector 40 is disposed to inject fuel into the combustion chamber 16, and is arranged with the fuel nozzle disposed in a geometrically central portion of a cylindrical cross-section of the combustion chamber 16 and aligned with a longitudinal axis thereof.

The fuel injector 40 fluidly and operatively couples to a fuel injection system, which supplies pressurized fuel at a flowrate that is suitable to operate the engine. The fuel injector 40 includes a flow control valve and a fuel nozzle that is disposed to inject fuel into the combustion chamber 16. The fuel may be any suitable composition such as, but not limited to, gasoline, ethanol, diesel, natural gas, and combinations thereof. The fuel nozzle may extend through the cylinder head 18 into the combustion chamber 16. Furthermore, the cylinder head may be arranged with the fuel injector 40 and fuel nozzle disposed in a geometrically central portion of a cylindrical cross-section of the combustion chamber 16 and aligned with a longitudinal axis thereof. The fuel nozzle may be arranged in line with the plasma igniter 30 between the intake valve 20 and the exhaust valve 22. Alternatively, the cylinder head 18 may be arranged with the fuel nozzle disposed in line with the plasma igniter 30 and orthogonal to a line between the intake valve 20 and the exhaust valve 22. Alternatively, the cylinder head 18 may be arranged with the fuel nozzle disposed in a side injection configuration. The arrangements of the cylinder head 18 including the fuel nozzle and the plasma igniter 30 described herein are illustrative. Other suitable arrangements may be employed within the scope of this disclosure.

The fuel nozzle includes an end defining one or a plurality of opening(s) (not shown) through which fuel flows into the combustion chamber 16, forming a spray pattern that includes a single one or a plurality of fuel plumes. The shape and penetration of the fuel plume(s) is a result of fuel momentum caused by fuel pressure and the configuration of the fuel nozzle, including cross-sectional area, shape and orientation of the opening(s) of the fuel nozzle relative to the combustion chamber 16, and combustion chamber flow dynamics. The combustion chamber flow dynamics may be driven by the shape of the combustion chamber 16, including presence of devices for generating swirl therein in certain embodiments, and other factors.

By way of non-limiting examples, when the fuel nozzle includes a single-hole device including a pintle and seat with a single circular cross-sectional opening into the combustion chamber 16, the resulting fuel spray pattern may be a single plume having a continuous, generally hollow conical shape. Alternatively, the fuel nozzle may be a multi-hole device including a pintle and seat with a plurality of openings through which fuel passes, and the resulting fuel spray pattern includes a plurality of radially projecting fuel plumes. In an embodiment wherein the fuel nozzle includes a plurality of openings, the fuel spray pattern formed during fuel injection includes a plurality of radially projecting fuel plumes that together form a generally conical shape in the combustion chamber 16 when viewed from a side view of the combustion chamber 16, wherein the conical shape has a spray angle that is preferably measured between major axes of one of the spray plumes that are oriented 180° apart on the fuel nozzle, or as outer boundaries defining the spray angle. Each of the plurality of spray plumes may have a generally conical shape, a generally flat shape or another suitable shape that is primarily dependent upon the cross-sectional shape of the openings of the fuel nozzle.

The cylinder head 18 also provides structure for mounting the plasma igniter 30 and a pass-through aperture 19 through which the plasma igniter 30 protrudes into the combustion chamber 16. As used herein, the term "groundless" indicates absence of a discrete element or structure proximal to the plasma igniter 30 fabricated from material that is capable of electrically coupling to an electrical ground path.

Figure 3:
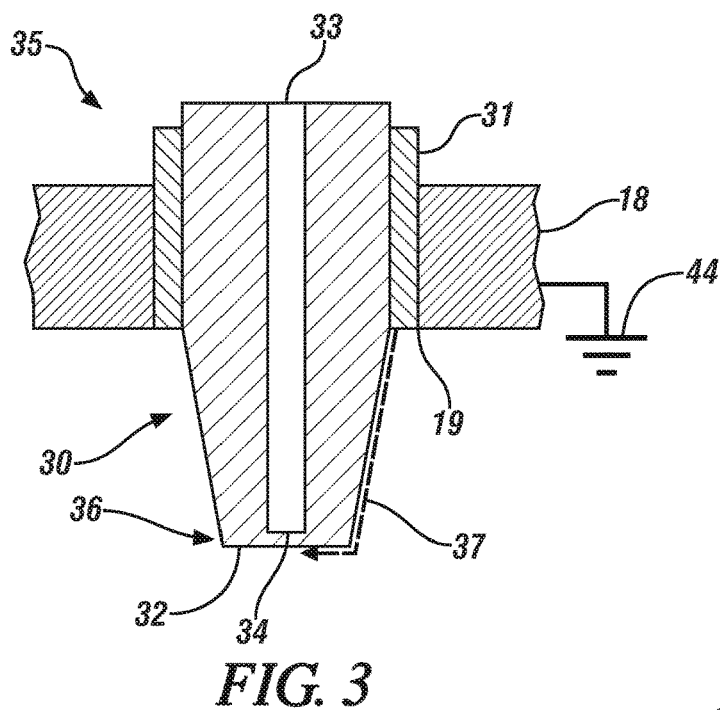
FIG. 3 schematically illustrates a cross-sectional side view of an in-cylinder groundless dielectric barrier-discharge plasma igniter mounted in a pass-through aperture of a cylinder head of an internal combustion engine, in accordance with the disclosure.
Figure 4:
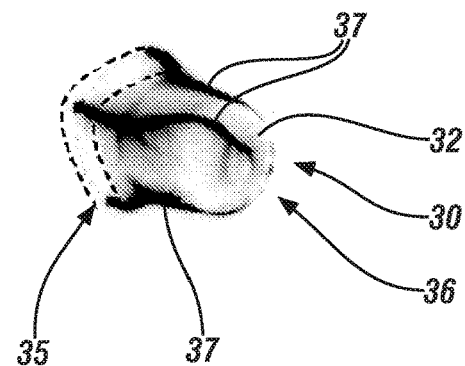
FIG. 4 schematically illustrates an isometric view of an in-cylinder groundless dielectric barrier-discharge plasma igniter and depicting a plurality of streamers generated by a single plasma discharge event, in accordance with the disclosure.

One embodiment of the plasma igniter 30 is described with reference to FIGS. 3 and 4, and preferably includes a single electrode 33 encased in a casing 32 formed from dielectric material, wherein the electrode 33 has a tip portion 34 near a second, distal end 36 that is opposite a first end 35 that electrically connects to the plasma ignition controller 50. In certain embodiments, the tip portion 34 of the electrode 33 is embedded in the casing 32 and has a thickness that is within a range between 1 mm and 5 mm. The plasma igniter 30 fixedly attaches to a mounting boss 31. The mounting boss 31 preferably threadably inserts through and attaches to the pass-through aperture 19 in the cylinder head 18 such that the tip portion 34 of the electrode 33 protrudes into the combustion chamber 16. The electrode 33 electrically connects to the plasma ignition controller 50 at its first end 35. The plasma ignition controller 50 monitors and controls operation of the plasma igniter 30, employing electric power supplied from a power source 55, e.g., a battery. The plasma ignition controller 50 electrically connects to the electrical ground path 44, thus forming an electrical ground connection to the cylinder head 18. The plasma ignition controller 50 is configured to apply a high-frequency, high-voltage electrical pulse to the plasma igniter 30 to generate a plasma discharge event.

The casing 32 provides a dielectric barrier around the electrode 33, preferably such that the length of the electrode 33 extends into the combustion chamber 16 when the plasma igniter 30 is in an installed position in the cylinder head 18. As such, the electrode 33 is fully encapsulated by the dielectric material. The casing 32 may be configured in a frustoconical shape that tapers in a narrowing fashion towards the distal end 36. This example is non-limiting, and the dielectric casing 32 may be otherwise shaped and/or contoured relative to the contour of the distal end 36. The distal end 36 may be shaped, for example, as a conical end, a cylindrical end, a chamfered cylindrical end, etc. Other cross-sectional shapes, e.g., oval, rectangular, hexagonal, etc., may be employed. Other configurations of groundless dielectric barrier-discharge plasma igniters may be employed with similar effect. Other non-limiting embodiments of groundless dielectric barrier-discharge plasma igniters may be found in International Application Publication Number WO 2015/130655 A1 with an International Publication Date of 3 Sep. 2015, which is also assigned to the Applicant. The dielectric material may be any suitable dielectric material capable of withstanding the temperatures and pressures of an engine combustion chamber. For example, the dielectric material may be a glass, quartz, or ceramic dielectric material, such as a high purity alumina.

During each plasma discharge event, the plasma ignition controller 50 applies a high frequency voltage to the electrode 33. In one example, the high-frequency, high-voltage electrical pulse may have a peak primary voltage of 100 V, secondary voltages between 10 and 70 kV, a duration of 2.5 ms, and a total energy of 1.0 J, with a frequency near one megahertz (MHz). The plasma discharge event generates one or a plurality of plasma discharge streamers 37, as best shown with reference to FIG. 4, which originate at the mounting boss 31 and propagate towards the tip portion 34. The plasma discharge streamers 37 may propagate across a surface of a longitudinal portion of the dielectric casing 32 of the electrode 33 in multiple radial locations and terminate on the distal end 36 at or near the tip portion 34. The plasma discharge streamers 37 interact with and ignite the cylinder charge, which combusts in the combustion chamber 16 to generate mechanical power. The specific details of the configuration of the plasma igniter 30, its arrangement in the combustion chamber 16, and operating parameters (peak voltage, frequency and duration) associated with electric power and timing of activation during each plasma discharge event are application-specific, and are preferably selected to achieve desired combustion characteristics within the combustion chamber 16. The multiple plasma discharge streamers 37 generate a large discharge area for effective flame development in stoichiometric homogeneous, lean homogeneous, rich homogeneous, and/or lean/rich stratified and lean controlled auto-ignition combustion applications.

The engine 100 includes an exhaust gas recirculation (EGR) system 70, including a controllable EGR valve for controlling a magnitude of flow of exhaust gas from the exhaust runner 26 to the intake runner 24. The ECM 60 is configured to monitor parameters associated with operation of the engine 100 and send command signals to control systems and actuators of the engine 100, as indicated by line 62. Systems controlled by the ECM 60 include, by way of non-limiting examples, the intake and exhaust variable valve actuation systems 21, 23, the fuel injector 40, the plasma ignition controller 50 and the EGR system 70.

The engine 100 selectively operates in one of a plurality of combustion modes depending upon operating conditions as described with reference to FIGS. 5-8. The disclosure may be applied to various engine systems and combustion cycles. In one embodiment, the engine 100 may be operably connected to a plurality of wheels disposed on one or more axles of a vehicle (not shown) to provide tractive power. For example, the engine 100 may be connected to a transmission (not shown) which may in turn rotate the one or more axles. The engine 100 may provide direct tractive power to the plurality of wheels, such as via the transmission connected to the one or more axles, or may provide power to one or more electric motors (not shown) that may in turn provide direct motive power to the plurality of wheels. In any event, the engine 100 may be configured to provide power to a vehicle by combusting fuel and converting chemical energy to mechanical energy.

The engine 100 advantageously employs an embodiment of the plasma ignition system including the groundless barrier-discharge plasma igniter to facilitate stable low-temperature combustion at highly dilute operating conditions, and thus provide an alternative to a spark plug ignition system that can enhance low-temperature, dilute combustion at high combustion pressures while achieving robust lean low-temperature combustion.

Figure 2:
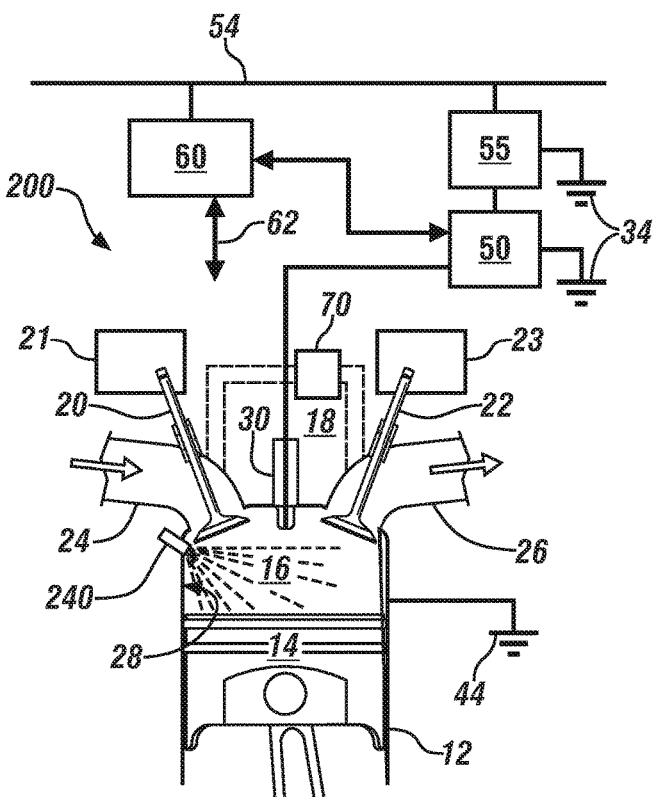

FIG. 2 schematically illustrates a cross-sectional view of a single cylinder for a multi-cylinder internal combustion engine (engine) 200, including an engine block 12 defining a plurality of cylinder bores 28 containing movable pistons 14, one of which is shown. The engine 200 further includes an embodiment of the plasma igniter 30 that is centrally disposed relative to a longitudinal axis of the cylinder bore 28, including tip portion 34 of the plasma igniter 30 that protrudes into the combustion chamber 16. In this embodiment, fuel injector 240 is located at an angle relative to a longitudinal axis of the cylinder bore 28 to inject fuel into the side of the combustion chamber 16. In all other aspects, the engine 200 and plasma igniter 30 are analogous to the engine 100 and plasma igniter 30 described with reference to FIGS. 1, 3 and 4. As such, the engine configurations are operative in stoichiometric and lean-operation combustion modes, including combustion formats that include propagating flame ignition, compression ignition and flame assisted compression ignition.

In each of the embodiments described with reference to FIGS. 1-2, the ECM 60 monitors inputs from engine and vehicle sensors to determine states of engine parameters. The ECM 60 is configured to receive operator commands, e.g., via an accelerator pedal and a brake pedal to determine an output torque request, from which engine control parameters and an engine torque command are derived. The ECM 60 executes control routines stored therein to determine states for the engine control parameters to control the aforementioned actuators to form a cylinder charge, including controlling throttle position, compressor boost, plasma ignition timing, fuel injection pulsewidth affecting injected fuel mass and timing, EGR valve position to control flow of recirculated exhaust gases, and intake and/or exhaust valve timing and phasing. Valve timing and phasing may include negative valve overlap (NVO) and lift of exhaust valve reopening (in an exhaust re-breathing strategy), and positive valve overlap (PVO). Engine parameters associated with a cylinder charge that are affected by individual engine control parameters may include air/fuel ratio, intake oxygen, engine mass airflow (MAF), manifold pressure (MAP) and mass-burn-fraction point (CA50 point). The air/fuel ratio may be controlled by the fuel injection pulsewidth and affects an amount of fuel injected into each combustion chamber 16 during each engine cycle. The engine mass airflow (MAF) and manifold pressure (MAP) are controlled by controlling NVO/PVO, electronic throttle control, and a turbocharger (when employed) and affects a magnitude of trapped air mass and a magnitude of residual gases in the combustion chamber 16. The intake oxygen may be controlled by the EGR valve, which controls a magnitude of external EGR during each engine cycle. The engine parameters of MAF, actual air/fuel ratio, intake oxygen, MAP and CA50 point may be directly measured using sensors, inferred from other sensed parameters, estimated, derived from engine models or otherwise dynamically determined by the ECM 60.

The terms controller, control module, module, control, control unit, processor and similar terms refer to any one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean any controller-executable instruction sets including calibrations and look-up tables. Each controller executes control routine(s) to provide desired functions, including monitoring inputs from sensing devices and other networked controllers and executing control and diagnostic instructions to control operation of actuators. Routines may be periodically executed at regular intervals, for example each 100 microseconds during ongoing operation. Alternatively, routines may be executed in response to occurrence of a triggering event. Communication between controllers, and communication between controllers, actuators and/or sensors may be accomplished using a direct wired link, a networked communication bus link 54, a wireless link or another suitable communications link. Communication includes exchanging data signals in any suitable form, including, for example, electrical signals via a conductive medium, electromagnetic signals via air, optical signals via optical waveguides, and the like. Data signals may include signals representing inputs from sensors, signals representing actuator commands, and communications signals between controllers. The term 'model' refers to a processor-based or processor-executable code and associated calibration that simulates a physical existence of a device or a physical process. As used herein, the terms 'dynamic' and 'dynamically' describe steps or processes that are executed in real-time and are characterized by monitoring or otherwise determining states of parameters, and regularly or periodically updating the states of the parameters during execution of a routine or between iterations of execution of the routine.

Figure 5:
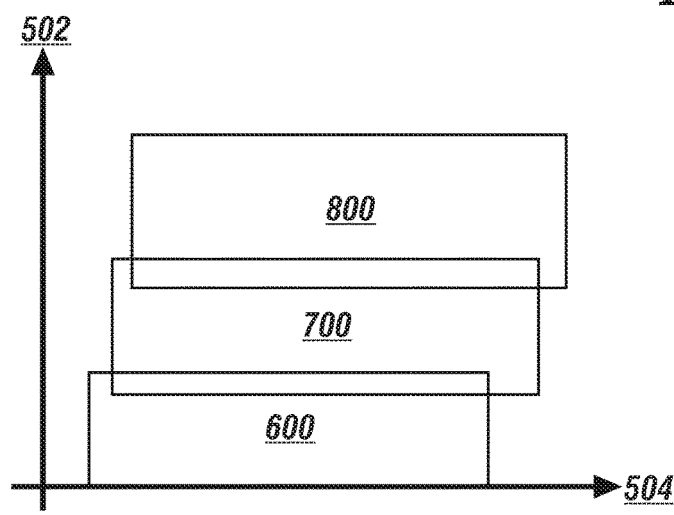
FIG. 5 graphically shows preferred engine operating modes associated with engine speed and load operating conditions for operating an embodiment of the engine described with reference to either FIG. 1 or 2, employing an embodiment of the plasma ignition controller to generate plasma discharge events, in accordance with the disclosure.

FIG. 5 graphically shows preferred engine operating modes associated with engine speed and load operating conditions for operating an embodiment of the engine described herein with reference to either FIG. 1 or 2, employing an embodiment of the plasma ignition controller 50 that applies the high-frequency, high-voltage electrical pulse to the plasma igniter 30 to generate plasma discharge events. The engine speed 502 is indicated on a horizontal axis and engine load 504 is indicated on a vertical axis. A flameless, controlled compression-ignition engine operating mode 600 is preferably selected when an output torque request indicates a low load condition. Details related to the flameless, controlled compression-ignition engine operating mode 600 are described with reference to FIG. 6. A flame-assisted controlled compression-ignition engine operating mode 700 is preferably selected when an output torque request indicates a mid-load condition. Details related to the flame-assisted controlled compression-ignition engine operating mode 700 are described with reference to FIG. 7. A flame-propagation engine operating mode 800 is preferably selected when the output torque request indicates a high-load condition. Details related to the flame-propagation engine operating mode 800 are described with reference to FIG. 8.

FIG. 6 graphically shows engine parameters over a single engine cycle during operation in the flameless, controlled compression-ignition engine operating mode 600. The engine parameters may be advantageously applied to an embodiment of the engine 100, 200 described herein with reference to FIGS. 1 and 2, employing an embodiment of the plasma ignition controller 50 that applies the high-frequency, high-voltage electrical pulse to the plasma igniter 30 to generate plasma discharge events, controls the fuel injector 40, 240 and controls the intake and exhaust variable valve actuation systems 21, 23, respectively. The flameless, controlled compression-ignition engine operating mode 600 is characterized by flameless low temperature combustion and controlled volumetric compression ignition of the cylinder charge. The engine parameters include fuel injection event(s) and plasma discharge event(s) during a single engine cycle that includes an exhaust stroke 612, an intake stroke 614, a compression stroke 616 and an expansion stroke 618, all of which are shown in context of rotational degrees 610 on a horizontal axis. The fuel injection event, indicated by an end-of-injection point 620 and plasma discharge events 630, 631, 632, 633 are shown in context of a valve lift scale 601 and a cylinder pressure scale 606. An exhaust valve lift event 602 is shown, and is associated with opening of the exhaust valve, and an intake valve lift event 604 is shown, and is associated with opening of the intake valve. An NVO event 603 is shown, and occurs between the closing of the exhaust valve 22 and the subsequent opening of the intake valve 20. Under certain operating conditions, the valve lift events may instead include operating employing PVO. The cylinder pressure includes a first cylinder pressure peak 607 associated with cylinder TDC during the NVO event 603. Cylinder pressure also includes a second cylinder pressure peak 608 associated with cylinder TDC between the compression and expansion strokes 616, 618. The end-of-injection point 620 of the fuel injection event may fall at any point within a range of engine rotation 622 that is associated with the NVO event 603. The flameless, controlled compression-ignition engine operating mode 600 is executed to achieve combustion of a lean cylinder charge without a propagating flame. The flameless, controlled compression-ignition engine operating mode 600 employs a single fuel injection event 620 with fuel reforming and subsequent multiple sequentially executed plasma discharge events 630, 631, 632 633 to generate radicals to effect combustion and power generation. This includes operating lean of stoichiometry and trapping residuals by employing the NVO or by employing an exhaust rebreathing strategy. Results associated with operation in the flameless, controlled compression-ignition engine operating mode 600 indicate that combustion instability may be reduced, thus permitting increased charge dilution when employing the plasma igniter 30 to generate multiple plasma discharge events.

FIG. 7 graphically shows engine parameters over a single engine cycle during operation in the flame-assisted controlled compression-ignition engine operating mode 700. The engine parameters may be advantageously applied to an embodiment of the engine 100, 200 described herein with reference to FIGS. 1 and 2, employing an embodiment of the plasma ignition controller 50 that applies the high-frequency, high-voltage electrical pulse to the plasma igniter 30 to generate plasma discharge events, controls the fuel injector 40, 240 and controls the intake and exhaust variable valve actuation systems 21, 23, respectively. The flame-assisted controlled compression-ignition engine operating mode 700 is characterized by flame-assisted combustion and controlled volumetric compression ignition of the cylinder charge. The engine parameters include fuel injection events and plasma discharge events during a single engine cycle that includes an exhaust stroke 712, an intake stroke 714, a compression stroke 716 and an expansion stroke 718, all of which are shown in context of rotational degrees 710 on a horizontal axis. The fuel injection events 720, 721 and plasma discharge events 730, 731, 732, 733 and 734 are shown in context of a valve lift scale 701 and a cylinder pressure scale 706. An exhaust valve lift event 702 is shown, and is associated with opening of the exhaust valve, and an intake valve lift event 704 is shown, and is associated with opening of the intake valve. A PVO event 703 is shown, and indicates an overlap between the opening of the intake valve and the subsequent closing of the exhaust valve. Under certain operating conditions, the intake and exhaust valve lift events may instead include operating employing NVO. The cylinder pressure includes a cylinder pressure peak 707 associated with cylinder TDC between the compression and expansion strokes 716, 718. The flame-assisted controlled compression-ignition engine operating mode 700 is executed to achieve combustion of a lean cylinder charge by initiating combustion with a lean-stratified charge followed by compression-ignition, thus effecting lean combustion at low combustion temperatures. The flame-assisted controlled compression-ignition engine operating mode 700 employs a first fuel injection event, indicated by an end-of-injection (EOI) 720, multiple sequentially executed plasma discharge events 730, 731, 732 and 733 to generate radicals. The EOI event 720 may occur at any time within a period 722 indicated around the PVO event 703, such that the first fuel injection event occurs after closing of the exhaust valve. A second fuel injection event indicated by EOI 721 and the subsequent plasma discharge event 734 are executed during the end of the compression stroke 716 to effect combustion and power generation.

Preferably, the plasma discharge event 734 is closely coupled in rotation to EOI 721, e.g., within 1-30 degrees of rotation after the end of the EOI 721. The plasma discharge event 734 is timed to achieve a desired combustion phasing that is responsive to the output torque request. This also includes operating lean of stoichiometry with external EGR activated to generate residuals. In certain embodiments, this may include operating employing NVO. Results associated with operation in the flame-assisted controlled compression-ignition engine operating mode 700 indicate that combustion instability may be reduced, thus permitting increased charge dilution when employing the plasma igniter 30 to generate multiple plasma discharge events.

Figure 8:
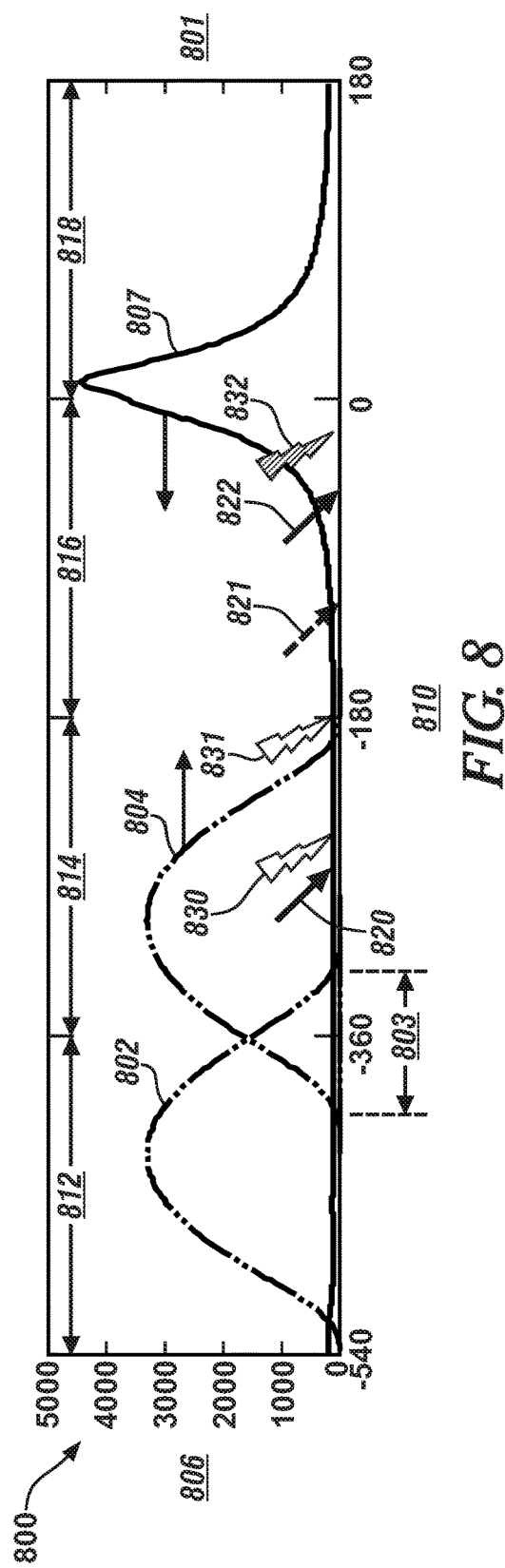
FIG. 8 graphically shows engine parameters during a single engine cycle during operation of an embodiment of the engine described with reference to either FIG. 1 or 2 in a flame-propagation engine operating mode.

FIG. 8 graphically shows engine parameters over a single engine cycle during operation in the flame-propagation engine operating mode 800. The engine parameters may be advantageously applied to an embodiment of the engine 100, 200 described herein with reference to FIGS. 1 and 2, employing an embodiment of the plasma ignition controller 50 that applies the high-frequency, high-voltage electrical pulse to the plasma igniter 30 to generate multiple plasma discharge events. The flame-propagation engine operating mode 800 is characterized by a propagating flame for charge ignition and combustion. The engine parameters include fuel injection events and plasma discharge events during a single engine cycle that includes an exhaust stroke 812, an intake stroke 814, a compression stroke 816 and an expansion stroke 818, all of which are shown in context of rotational degrees 810 on a horizontal axis. The fuel injection events 820, 821 and plasma discharge events 830 and 831 are shown in context of a valve lift scale 801 and a cylinder pressure scale 806. An exhaust valve lift event 802 is shown, and is associated with opening of the exhaust valve, and an intake valve lift event 804 is shown, and is associated with opening of the intake valve. A PVO event 803 is shown, and indicates an overlap between the opening of the intake valve and the subsequent closing of the exhaust valve. The cylinder pressure includes a cylinder pressure peak 807 associated with cylinder TDC between the compression and expansion strokes 816, 818. The flame-propagation engine operating mode 800 is executed to achieve combustion of a stoichiometric cylinder charge with a propagating flame. The flame-propagation engine operating mode 800 employs a first fuel injection event 820, multiple sequentially executed plasma discharge events 830 and 831 to generate radicals. Two plasma discharge events 830 and 831 are shown, but there may be more plasma discharge events. The first fuel injection event 820 preferably occurs early in the intake stroke 814 and may occur prior to or subsequent to 821 the sequentially executed plasma discharge events 830 and 831 to generate radicals. The first fuel injection event 820 facilitates a nearly homogeneous mixture. A second fuel injection event 822 facilitates cylinder charge stratification and a subsequent second plasma discharge event 832 are executed during the end of the compression stroke 816 to effect combustion and power generation.

Preferably, the second plasma discharge event 832 is closely coupled in rotation to the second fuel injection event 822, e.g., within 1-40 degrees of rotation after the end of the second fuel injection event 822. The plasma discharge event 832 is timed to achieve a desired combustion phasing that is responsive to the output torque request. This also includes operating at stoichiometry with external EGR activated to generate residuals, the EGR may be at or near 32% dilution in certain embodiments. In certain embodiments, this may instead include operating in a lean regime and employing NVO. Results associated with operation in the flame-propagation engine operating mode 800 indicate that combustion instability may be reduced, thus permitting increased charge dilution when employing the groundless dielectric barrier-discharge plasma igniter 30 to generate multiple plasma discharge events.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. An internal combustion engine, comprising:
a combustion chamber formed by cooperation of a cylinder bore formed in a cylinder block, a cylinder head and a piston;
an intake valve and an exhaust valve disposed in the cylinder head and operative to control gas flow to the combustion chamber, and variable valve actuation systems operative to control openings and closings of the intake valve and the exhaust valve;
a fuel injection system including a fuel injector disposed to inject fuel into the combustion chamber;
a plasma ignition system electrically connected to a groundless barrier discharge plasma igniter protruding into the combustion chamber; and
a controller operative to control operation of the variable valve actuation systems, the fuel injection system and the plasma ignition system in response to an output torque request, the controller including an instruction set, the instruction set executable to:
control the engine to operate in a compression-ignition mode when the output torque request indicates a low load condition, including providing instructions to control the variable valve actuation systems and control the plasma ignition system to execute plasma discharge events subsequent to controlling the fuel injection system to execute a fuel injection event that achieves a cylinder charge having a lean air/fuel ratio.

2. The internal combustion engine of claim 1, comprising the instruction set executable to control the engine in a flameless compression-ignition mode when the output torque request indicates the low load condition, including providing instructions to control the variable valve actuation systems to achieve a negative valve overlap state and control the plasma ignition system to execute plasma discharge events subsequent to controlling the fuel injection system to execute the fuel injection event.

3. The internal combustion engine of claim 1, comprising the instruction set executable to control the engine in a flame-assisted compression-ignition mode when the output torque request indicates the low load condition, including providing instructions to control the variable valve actuation systems to achieve a negative valve overlap state and control the plasma ignition system to execute plasma discharge events subsequent to controlling the fuel injection system to execute the fuel injection event.

4. The internal combustion engine of claim 1, comprising the instruction set executable to control the engine in a flameless compression-ignition mode when the output torque request indicates the low load condition, including providing instructions to control the variable valve actuation systems to achieve a positive valve overlap state and control the plasma ignition system to execute plasma discharge events subsequent to controlling the fuel injection system to execute the fuel injection event.

5. The internal combustion engine of claim 1, comprising the instruction set executable to control the engine in a flame-assisted compression-ignition mode when the output torque request indicates the low load condition, including providing instructions to control the variable valve actuation systems to achieve a positive valve overlap state and control the plasma ignition system to execute plasma discharge events subsequent to controlling the fuel injection system to execute the fuel injection event.

6. The internal combustion engine of claim 1, further comprising the controller including an instruction set executable to control the engine in a flame-assisted controlled compression-ignition mode when the output torque request indicates a mid-load condition, including instructions to control the variable valve actuation systems to achieve a positive valve overlap state, control the plasma ignition system to execute multiple plasma discharge events subsequent to controlling the fuel injection system to execute a first fuel injection event, and then control the fuel injection system to execute a second fuel injection event and control the plasma ignition system to execute another plasma ignition event during a compression stroke, wherein the first and second fuel injection events achieve a cylinder charge having a lean air/fuel ratio.

7. The internal combustion engine of claim 1, further comprising the controller including an instruction set executable to control the engine in a flame-assisted controlled compression-ignition mode when the output torque request indicates a mid-load condition, including instructions to control the variable valve actuation systems to achieve a negative valve overlap state, control the plasma ignition system to execute multiple plasma discharge events subsequent to controlling the fuel injection system to execute a first fuel injection event, and then control the fuel injection system to execute a second fuel injection event and control the plasma ignition system to execute another plasma ignition event during a compression stroke, wherein the first and second fuel injection events achieve a cylinder charge having a lean air/fuel ratio.

8. The internal combustion engine of claim 1, further comprising an exhaust gas recirculation (EGR) system including a controllable EGR valve.

9. The internal combustion engine of claim 8, further comprising the controller operative to control operation of the variable valve actuation systems, the fuel injection system, the plasma ignition system and the EGR system in response to the output torque request, the controller including an instruction set, the instruction set executable to control the engine in a flame-propagation mode when the output torque request indicates a high load condition, including instructions to control the EGR system to dilute the cylinder charge, control the variable valve actuation systems to achieve a positive valve overlap state, control the plasma ignition system to execute plasma discharge events and control the fuel injection system to execute a first fuel injection event, and control the plasma ignition system to execute another plasma ignition event during a compression stroke, wherein the first fuel injection event achieves a cylinder charge having a stoichiometric air/fuel ratio.

10. The internal combustion engine of claim 9, further comprising the instruction set executable to execute a second fuel injection event during the compression stroke, wherein the first and second injection events achieve a cylinder charge having a stoichiometric air/fuel ratio.

11. The internal combustion engine of claim 8, further comprising the controller operative to control operation of the variable valve actuation systems, the fuel injection system, the plasma ignition system and the EGR system in response to the output torque request, the controller including an instruction set, the instruction set executable to control the engine in a flame-propagation mode when the output torque request indicates a high load condition, including instructions to control the EGR system to dilute the cylinder charge, control the variable valve actuation systems to achieve a negative valve overlap state, control the plasma ignition system to execute plasma discharge events and control the fuel injection system to execute a first fuel injection event, and control the plasma ignition system to execute another plasma ignition event during a compression stroke, wherein the first fuel injection event achieves a cylinder charge having a stoichiometric air/fuel ratio.

12. The internal combustion engine of claim 11, further comprising the instruction set executable to execute a second fuel injection event during the compression stroke, wherein the first and second injection events achieve a cylinder charge having a stoichiometric air/fuel ratio.

13. The internal combustion engine of claim 1, wherein the groundless barrier discharge plasma igniter comprises an electrode encased in a dielectric material, the electrode including a tip portion encased in the dielectric material and disposed in the combustion chamber.

14. The internal combustion engine of claim 1, wherein the plasma ignition controller electrically connects to an electrical ground path connected to the cylinder head.

15. The internal combustion engine of claim 1, wherein the controller operative to control the plasma ignition system comprises the controller being configured to apply a high-frequency, high-voltage electrical pulse to the groundless barrier discharge plasma igniter.

16. The internal combustion engine of claim 15, wherein the controller configured to apply a high-frequency, high-voltage electrical pulse to the groundless barrier discharge plasma igniter comprises the controller being configured to apply an electrical pulse having a frequency near 1 megahertz at a voltage in the range of 10 to 70 kilovolts to the groundless barrier discharge plasma igniter.

17. A method for controlling an internal combustion engine including a plasma ignition system, a variable valve actuation system, an exhaust gas recirculation (EGR) system including a controllable EGR valve, and a fuel injection system, the method comprising:
 installing a groundless barrier discharge plasma igniter onto the engine wherein a portion of the plasma igniter protrudes into a combustion chamber of the engine, and wherein the plasma igniter electrically connects to the plasma ignition system; and
 controlling the engine in a flameless compression-ignition mode when an output torque request indicates a low load condition, including:
  controlling the EGR system to dilute the cylinder charge and controlling the variable valve actuation system to achieve a negative valve overlap state,
  executing fuel injection events to achieve a cylinder charge having a lean air/fuel ratio, and
  controlling the plasma ignition system to control the plasma igniter to execute multiple plasma discharge events subsequent to the fuel injection events.

18. The method of claim 17, further comprising controlling the engine in a flame-assisted compression-ignition mode when the output torque request indicates a mid-load condition, including controlling the variable valve actuation systems to achieve a positive valve overlap state, controlling the plasma ignition system to execute multiple plasma discharge events subsequent to controlling the fuel injection system to execute a first fuel injection event, and then controlling the fuel injection system to execute a second fuel injection event and controlling the plasma ignition system to execute another plasma ignition event during a compression stroke, wherein the first and second fuel injection events achieve a cylinder charge having a lean air/fuel ratio.

19. The method of claim 17, further comprising controlling the engine in a flame-propagation mode when the output torque request indicates a high load condition, including instructions to control the EGR system to dilute the cylinder charge, control the variable valve actuation systems to achieve a positive valve overlap state, control the plasma ignition system to execute plasma discharge events and control the fuel injection system to execute at least one fuel injection event, and control the plasma ignition system to execute another plasma ignition event during a compression stroke, wherein the at least one first fuel injection event achieves a cylinder charge having a stoichiometric air/fuel ratio.

\* \* \* \* \*